United States Patent [19]

Silvey

[11] 4,119,298

[45] Oct. 10, 1978

[54] TREE FELLING RAM WITH SAFETY CHECK VALVE

[76] Inventor: Elmer R. Silvey, 1231 Dutton Rd., Eagle Point, Oreg. 97524

[21] Appl. No.: 825,729

[22] Filed: Aug. 18, 1977

[51] Int. Cl.[2] .......................... B66F 3/24; A01G 23/08

[52] U.S. Cl. .................................. 254/93 R; 137/521; 137/498; 144/34 A

[58] Field of Search ........................... 254/93 R, 93 H; 144/34 A; 137/521, 498

[56] References Cited

U.S. PATENT DOCUMENTS

| | | | |
|---|---|---|---|
| 1,528,857 | 3/1925 | Strandberg et al. | 254/93 R |
| 1,812,577 | 6/1931 | Albertine | 254/93 H X |
| 2,864,394 | 12/1958 | Hempel | 137/521 |
| 2,923,317 | 2/1960 | McInerney | 137/521 |
| 3,228,658 | 1/1966 | London | 254/93 R |
| 3,313,019 | 4/1967 | Fuselier | 254/93 R |

*Primary Examiner*—Robert C. Watson

*Attorney, Agent, or Firm*—Eugene M. Eckelman

[57] ABSTRACT

A cylinder housing has a passageway extending in from the exterior thereof for admitting and discharging fluid to a cylinder portion. A piston in the cylinder has return movement by means of a resilient retracter, and a check valve having protected support in the housing is arranged to close off fluid discharge from the cylinder under abnormal fluid pressure return conditions such as when the ram is in use and there is a failure in the fluid supply for the piston.

5 Claims, 4 Drawing Figures

TREE FELLING RAM WITH SAFETY CHECK VALVE

BACKGROUND OF THE INVENTION

This invention relates to a new and novel ram of a type used to assist in felling trees by engagement between top and bottom portions of a backcut in the tree.

Rams have heretofore been provided to assist in felling trees by first making a backcut in the tree and then utilizing the ram between top and bottom portions of the backcut to apply an expanding pressure. With the use of these rams, trees can be felled in precise directions even though they may lean away from the direction in which felling is desired. Such a ram is shown in my U.S. Pat. No. 4,026,524. In such structure, pump means are provided for expanding the ram. Such pump means preferably are connected to the ram by flexible conduit so that persons felling the tree can stand away from the tree when the ram is operated.

The use of such flexible conduits, or of course other fluid supply means for the ram, are exposed to damage by other equipment, falling limbs, or the like. If pumping equipment or the fluid conduits should be damaged at the time the ram is in operation, a sudden release of fluid pressure could allow the tree to fall backwards, thus endangering personnel in the area and also possibly ruining the tree. Check valve means can be placed in the fluid supply; however, if the damage occurs on the ram side of the check valve, such check valve means is ineffective.

SUMMARY OF THE INVENTION

According to the present invention and forming a primary objective thereof, a ram is provided with a check valve in its fluid supply arranged to hold the ram extended in the event of abnormal fluid pressure return conditions, the check valve having protected support in the housing to protect it against damage from exterior forces. In carrying out such objectives, the ram has fluid inlet means extending from the exterior of its housing to the interior, and check valve means are associated with such fluid inlet means, preferably interiorly of the housing, so as to be free from damage by exterior forces.

The invention will be better understood and additional objects and advantages will become apparent from the following description taken in connection with the accompanying drawings.

DETAILED DESCRIPTION OF A PREFERRED EMBODIMENT

Figure 1:
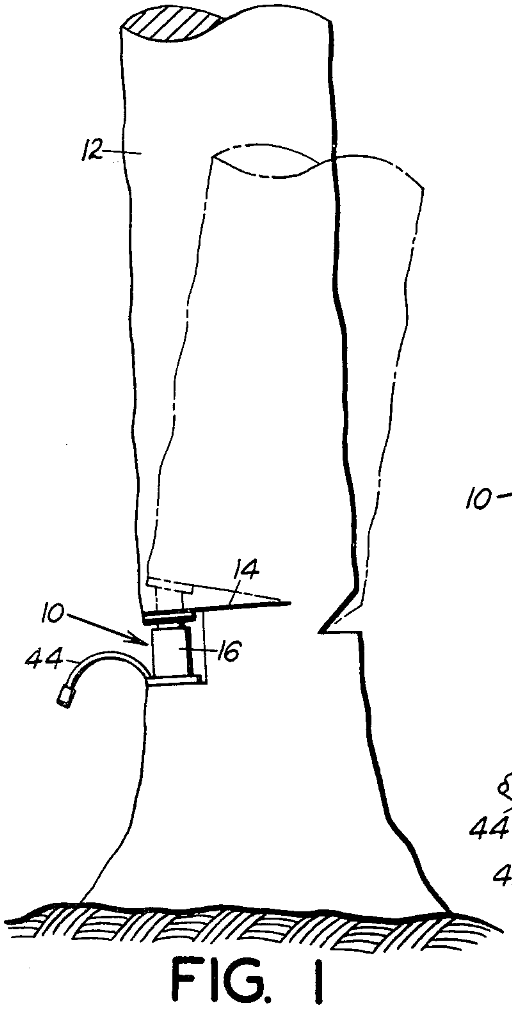
FIG. 1 is an elevational view of the present ram as applied in the backcut of a tree and showing in broken lines the operation of the ram to force the tree over.

With particular reference first to FIG. 1, a fluid operated ram of the type embodying the invention is designated by the numeral 10 and can assist in felling a tree 12 by engagement between top and bottom portions of a backcut 14. FIG. 1 shows in broken lines the operation of the ram, namely, in a normal position of the tree, it leans backward relative to the direction in which it is desired to fell it but by operation of the ram, as shown in broken lines, the tree can be felled forward.

Figure 2:
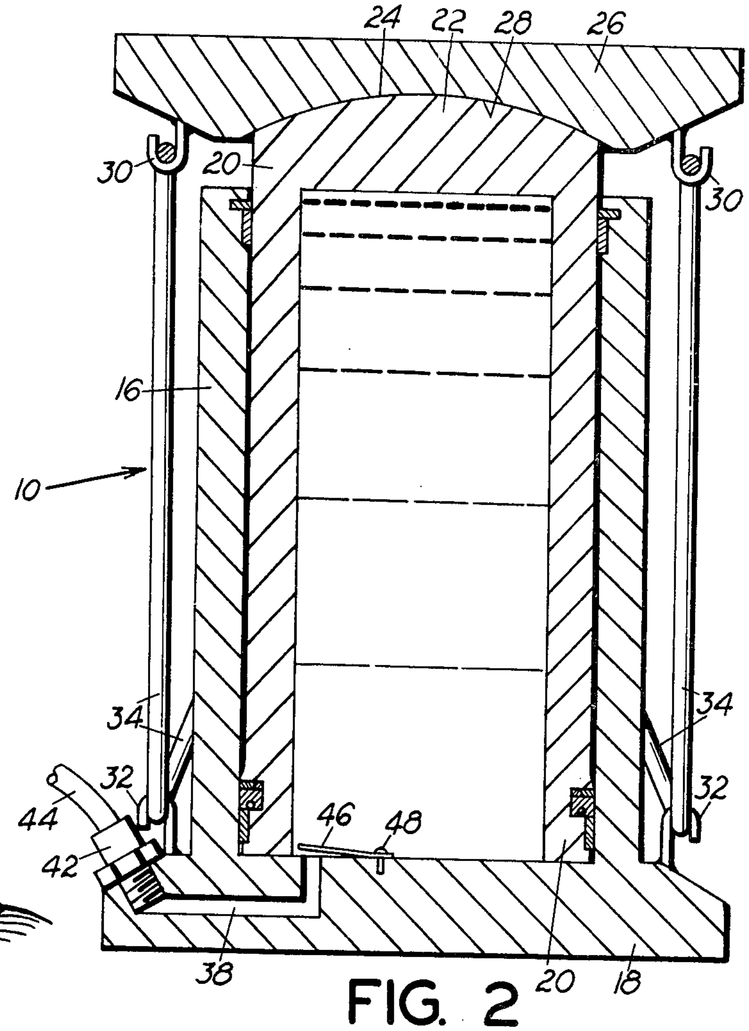
FIG. 2 is an enlarged vertical sectional view taken through a fluid operated ram of the present invention.

With reference to FIG. 2, the ram 10 comprises a cylinder housing 16 open at the top and closed at the bottom by an integral base 18. Slidable in the cylinder housing 16 is a hollow or tubular piston 20 open at the bottom and closed at its top end by a wall 22. The end surface 24 of the wall 22 assumes a convex curvature, and associated with the upper or drive end of the piston is a head 26 in the form of a plate having a concave or cupped portion 28 on its bottom surface engageable with the convex surface 24.

Head 26 is enlarged relative to the piston and has depending hooks 30 associated with cooperating upstanding hooks 32 on the base 18 for engagement by a resilient cord 34 which serves to hold the head 26 slidably on the piston and also to retract the piston after its use in felling a tree.

Inlet means for fluid which drives the piston comprises a passageway 38 leading from an exterior portion of the base 18 to an interior portion of the housing 16 at a place in alignment with the hollow portion of the piston 20. Passageway 38 in the FIG. 2 embodiment opens through the inner surface of the base 18. Associated with the passageway 38 is a connector 42 for a conduit 44, such as a flexible conduit, leading to a pump which operates the ram. In the normal operation of the ram, the piston is driven outwardly to force the tree over, and the piston returns under the force of the resilient cord 34 and gravity.

If the conduit 44 or pump means should become damaged or inoperative to the extent that fluid pressure is lost in the system, the ram would release and it is possible that the tree could then fall backwards. To overcome this hazardous possibility, a flap valve 46 is secured on the inner wall of the base 18 and has a normally open but close association with the inlet opening of the fluid passageway 38. Valve 46 is held in place by a suitable fastener 48 and in such fastened position is disposed in its open condition. The flexibility of the valve 46 is such that in normal retracting movement of the piston 20 under the action of resilient cord 34 and gravity, fluid can discharge toward the pump. However, the flexibility of the valve is preselected such that if a greater returning force than for normal operation is present, the valve will be forced down over the opening to passageway 38 and shut off return flow. Thus, in the event that the conduit 44 is severed or the pump should accidentally release fluid, the valve will close and the ram will hold in its extended position until the problem is solved and fluid pressure applied. The tree will thus be kept from falling backwards. The valve 46, being disposed within the housing, cannot be damaged by exterior forces. The hollow piston 20 with the open end allows for convenient mounting of the valve interiorly of the cylinder housing.

Figure 3:
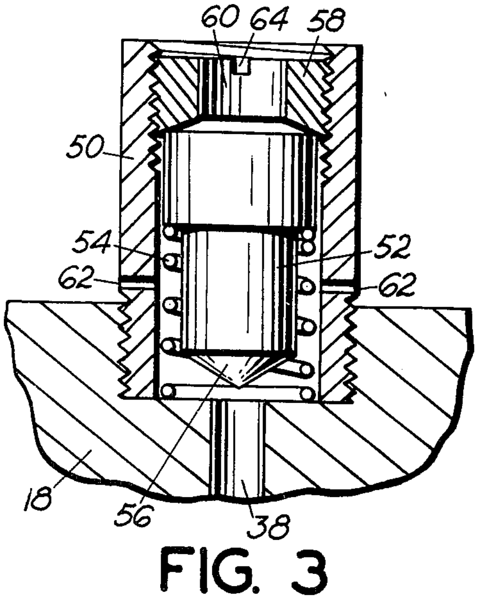
FIG. 3 is an enlarged fragmentary sectional view showing a second embodiment of check valve used with the present invention.

FIG. 3 shows a second embodiment of valve for preventing return of fluid in the event of failure in the fluid inlet means. This valve comprises a valve housing 50 screw threadedly mounted in the base 18 at the inlet of fluid passageway 38, and such housing has a valve plunger 52 urged to an upper inoperative position by a spring 54. The bottom end of the plunger comprises a pointed tip 56 arranged to seat at an inner end of passageway 38. A nut 58 has screw threaded mounting in the housing 50 at the top of the plunger 52 and has a central enlarged aperture 60 which exposes the upper end of the plunger to fluid in the housing. Housing 50 has side ports 62 below the top of the valve which allow for the flow of fluid in normal operation of the ram. However, in the event of a release of pressure in the line 44 or pump during operation of the ram, plunger 52 will be forced down to close off passageway 38. Such plunger will remain seated as long as the abnormal pressure condition exists. Nut 58 has a screwdriver slot 64 for installing and removing it as well as for adjusting it to regulate the speed and pressure at which the valve closes.

Figure 4:
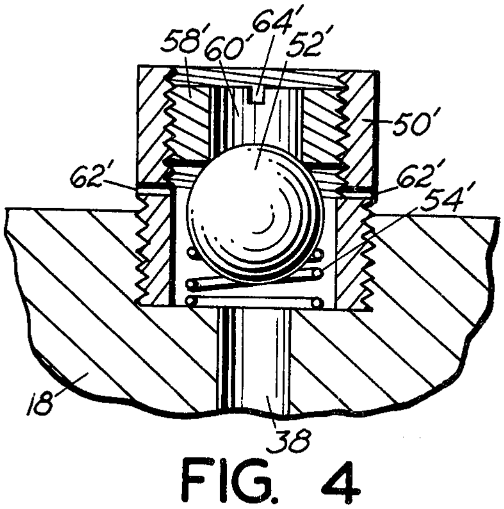
FIG. 4 is an enlarged fragmentary sectional view showing another embodiment of check valve.

FIG. 4 shows another embodiment of valve. Such valve is similar to FIG. 3 in that it has a housing 50' screw threadedly mounted in the base at the inner end of passageway 38 and has a valve member 52' which is in the form of a ball check valve. Valve member 52' is spring pressed upwardly by a spring 54' and is held in place by a nut 58' having a central aperture 60'. Fluid flow under normal condition is through ports 62' and the operation of the member 52' under abnormal conditions is the same as the valve 52 in FIG. 3.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A ram to assist in felling a tree by engagement between top and bottom portions of a backcut in the tree, comprising (a) a cylinder portion having a base forming a closed end of said cylinder portion and arranged to engage one of the top or bottom portions of a backcut, (b) said cylinder portion having an opening at the other end from said base, (c) a piston in said cylinder portion having extending and retracting longitudinal movements, (d) said piston having a drive end projecting from the opening in said cylinder portion, (e) said piston also having a hollow portion facing said base of said cylinder portion, (f) a head on said piston arranged to engage the other of the top or bottom portions of the backcut, (g) fluid inlet means leading inwardly from the exterior of said base and opening into said cylinder portion, (h) said fluid inlet means being arranged for association with a pressure supply and control means for admitting and returning fluid in said fluid inlet means for operating said piston, (i) and check valve means at said opening of said fluid inlet means into said cylinder portion, (j) the opening of said fluid inlet means being in alignment with the hollow portion of said piston whereby to locate said valve means within said cylinder portion and also in alignment with the hollow portion of said piston, (k) said check valve means being operative to allow discharge of fluid under normal retracting conditions of said piston but operative to close off fluid return under abnormal pressure conditions to hold the piston stationary in said housing.

2. The ram of claim 1 including resilient tension means connected between said housing and piston for retracting said piston, said check valve means allowing discharge of fluid under the retracting force of said tensioning means but closing off fluid discharge in said abnormal conditions.

3. The ram of claim 1 wherein said check valve means comprises a flap valve secured to said base.

4. The ram of claim 1 wherein said check valve comprises a spring pressed valve.

5. The ram of claim 1 wherein said check valve means is adjustable to vary the speed and pressure at which it closes.

* * * * *

UNITED STATES PATENT OFFICE

CERTIFICATE OF CORRECTION

PATENT NO. : 4,119,298

DATED : October 10, 1978

INVENTOR(S) : Elmer R. Silvey

It is certified that error appears in the above-identified patent and that said Letters Patent are hereby corrected as shown below:

Column 4, line 27, change "housing" to --cylinder portion--; line 29, change "housing" to --cylinder portion--.

Signed and Sealed this

*Eighth* Day of *May 1979*

[SEAL]

*Attest:*

RUTH C. MASON
*Attesting Officer*

DONALD W. BANNER
*Commissioner of Patents and Trademarks*